United States Patent [19]

James

[11] 4,411,513
[45] Oct. 25, 1983

[54] READER-PRINTER

[75] Inventor: Paul M. James, London, England

[73] Assignee: Imaging Technology Limited, London, England

[21] Appl. No.: 238,584

[22] Filed: Feb. 26, 1981

[30] Foreign Application Priority Data

Mar. 5, 1980 [GB] United Kingdom ............... 8007499

[51] Int. Cl.³ ...................... G03G 15/02; G03G 15/22
[52] U.S. Cl. ......................................... 355/5; 355/44; 355/45
[58] Field of Search ........................ 355/3 R, 44, 45, 5

[56] References Cited

U.S. PATENT DOCUMENTS

| | | | |
|---|---|---|---|
| 3,083,869 | 4/1963 | Crumrine et al. | 221/293 |
| 3,511,564 | 5/1970 | Gawin et al. | 355/5 X |
| 3,612,682 | 10/1971 | Shelffo et al. | 355/10 X |
| 3,623,806 | 11/1971 | Short | 355/14 |
| 3,630,606 | 12/1971 | Sage | 355/3 |
| 3,899,248 | 8/1975 | Tiger | 355/5 |
| 3,901,593 | 8/1975 | Kogiso et al. | 355/11 |
| 3,942,886 | 3/1976 | Tanaka | 355/5 X |
| 3,951,543 | 4/1976 | Mulligan | 355/5 X |
| 4,054,379 | 10/1977 | Sone et al. | 355/5 |

FOREIGN PATENT DOCUMENTS 1388033 3/1975 United Kingdom .

Primary Examiner—Fred L. Braun
Attorney, Agent, or Firm—Dann, Dorfman, Herrell and Skillman

[57] ABSTRACT

A microfilm reader-printer has a reservoir for copy sheets located near the top of a housing and when a permanent copy of an image projected on a screen (via a lens and a mirror) is required, a sheet is manually removed from the reservoir and fed to the input of a charging station. The sheet is mechanically fed through the charging station to drop by gravity into an exposure station for exposure with the image. Following exposure, the sheet makes a second gravity-induced drop into the nip of a roller pair forming the inlet of a development station. The sheet is fed through the development station, and then the printed sheet exits from an opening below a viewing window.

10 Claims, 5 Drawing Figures

READER-PRINTER

This invention relates to a microfilm reader-printer.

There are basically two types of microfilm reader which use an image recorded on microfilm as an input and project a magnified image of the film onto a screen for viewing by an observer. The first type, known as the "back projection" type, uses a translucent screen onto the rear surface of which the image is projected (the observer thus viewing by transmitted light). The second type, known as the "front projection" type, uses a screen illuminated from the same side as the observer, the observer thereby seeing the image via reflected light.

Both types of reader can be provided with a facility permitting the user to produce a permanent copy of an image which he has been viewing and such a device is known as a reader-printer. Normally the print facility makes use of the electrophotographic technique in which a uniformly charged photoconductive surface is exposed to the image to produce variations of charge distribution on the surface, the surface then being contacted with toner particles which are preferentially attracted to the surface in dependence on the charge image formed thereon, a permanent copy being produced from the array of toner particles thereby formed on the photoconductive surface.

Reader-printers operating on both the back projection and front production type are known and a considerable number of alternative designs are currently available. The properties which make one particular design of reader-printer commercially more successful than another are difficult to define but, in general, desirable properties of a reader-printer are (a) the ease with which a user can operate the device, (b) the reliability of the device in use, (c) the compactness of the design and thus the overall size of the device and, (d) the initial cost of the device. The present invention relates to a new design of reader-printer which by virtue of its unique layout, which embodies the above-listed desirable properties, is expected to have significant market impact.

According to one aspect of the present invention a reader-printer comprising a housing having a screen on which an image of a film is projected, and an electrophotographic print facility within the housing for producing a print on a copy sheet of an image projected on the screen which print facility comprises a charging station, an exposure station and a development station is characterised in that the path for a copy sheet through the housing extends downwardly from the charging station to the exposure station, whereby a uniformly charged copy sheet can drop into the exposure station prior to the formation of the charge image thereon.

The invention is particularly applicable to a front projection reader-printer in which the screen is formed by a plane surface located within the housing and viewed through a transparent window of the housing. By inclining the screen at an angle suitable for viewing through the window (in practice an angle of 45° plus 25° or minus 10° is particularly convenient) it has been found that a copy sheet can be slid into the desired exposure position on the screen by feeding it from a charging station disposed above the screen and allowing the sheet to drop from exit rolls of the charging station into the desired exposure position on the screen.

Desirably the exposure position is defined by retractable edge stops which temporarily hold the charged copy sheet in position for the exposure and then release it for onward movement through the development station.

A front projection reader-printer is known from U.S. Pat. No. 4,054,379 but this design utilises upward movement of a copy sheet through the exposure and development stations and thus necessitates some form of conveyor to feed the copy sheet into and out of the exposure station, such a conveying system adding to the complexity of the device.

A device in accordance with the present invention which utilises a downward path for a copy sheet through the component parts of the print facility, can be of much simpler design than the known device thus permitting the production of a more compact and less expensive unit.

Since the path of a copy sheet through the device is in the downward direction, it is desirable to locate a reservoir for copy sheets at the top of the device and this reservoir can be coupled to the charging station by an automatic sheet feed or, in the case of a device designed for only occasional use of the print facility, for manual feed of sheets from the reservoir into the inlet end of the charging station.

Since conventional copy sheets are rectangular with ends which are shorter than the sides and it is sometimes more convenient to produce the image on the sheet with an end uppermost and on other occasions with a side uppermost, a reader-printer in accordance with the invention is desirably provided with a screen wide enough to receive the copy sheet with a side uppermost and to provide two sets of stop means on the screen, a lower stop means being effective if the copy sheet is fed through the charging station with an end thereof leading and a higher stop means effective if the copy sheet is fed through the charging station with a side thereof leading. Arranging the stop means in this way ensures that the device automatically arrests the downward movement of the copy sheet at the correct position on the screen.

To ensure that the copy sheet passes through the development station with its leading end normal to the direction of the movement of the sheet through the development station, it is desirable to provide an inlet nip for the development station which is defined between a pair of confronting rollers, to allow the copy sheet to drop against the upstream side of that nip when the stop means is withdrawn from the leading edge of the copy sheet after exposure has been effected in the exposure station, but to slightly delay the commencement of rotation of the confronting rollers by a time sufficient to ensure that the copy sheet has become stationary against the nip with its leading edge accurately aligned with the nip.

A particularly compact arrangement of device is achieved if the outlet of the development station is on the front of the device below the viewing window.

According to a further aspect of the present invention, a method of producing a copy of an image in a microfilm reader-printer comprises gravity feeding an electrostatically charged copy sheet into an exposure station prior to exposure therein, and gravity feeding the exposed copy sheet with a charge image formed thereon from the exposure station to the inlet of a development station in which the charge image can be converted into a toner image.

Desirably the inlet to the development station is defined by the nip between a pair of rollers and the copy sheet dwells at the entrances to that nip, after its gravity feed thereto, prior to rotation of the rollers commencing to further advance the copy sheet through the development station.

Suitably the charging of the copy sheet is effected in a charging station, the inlet of which comprises a pair of rollers defining a nip therebetween, one of the rollers of that pair being manually rotatable to permit at least initial manual feed of the copy sheet into the charging station.

One embodiment of reader-printer in accordance with the invention will now be described, by way of example, with reference to the accompanying drawings, in which.

Figure 1:
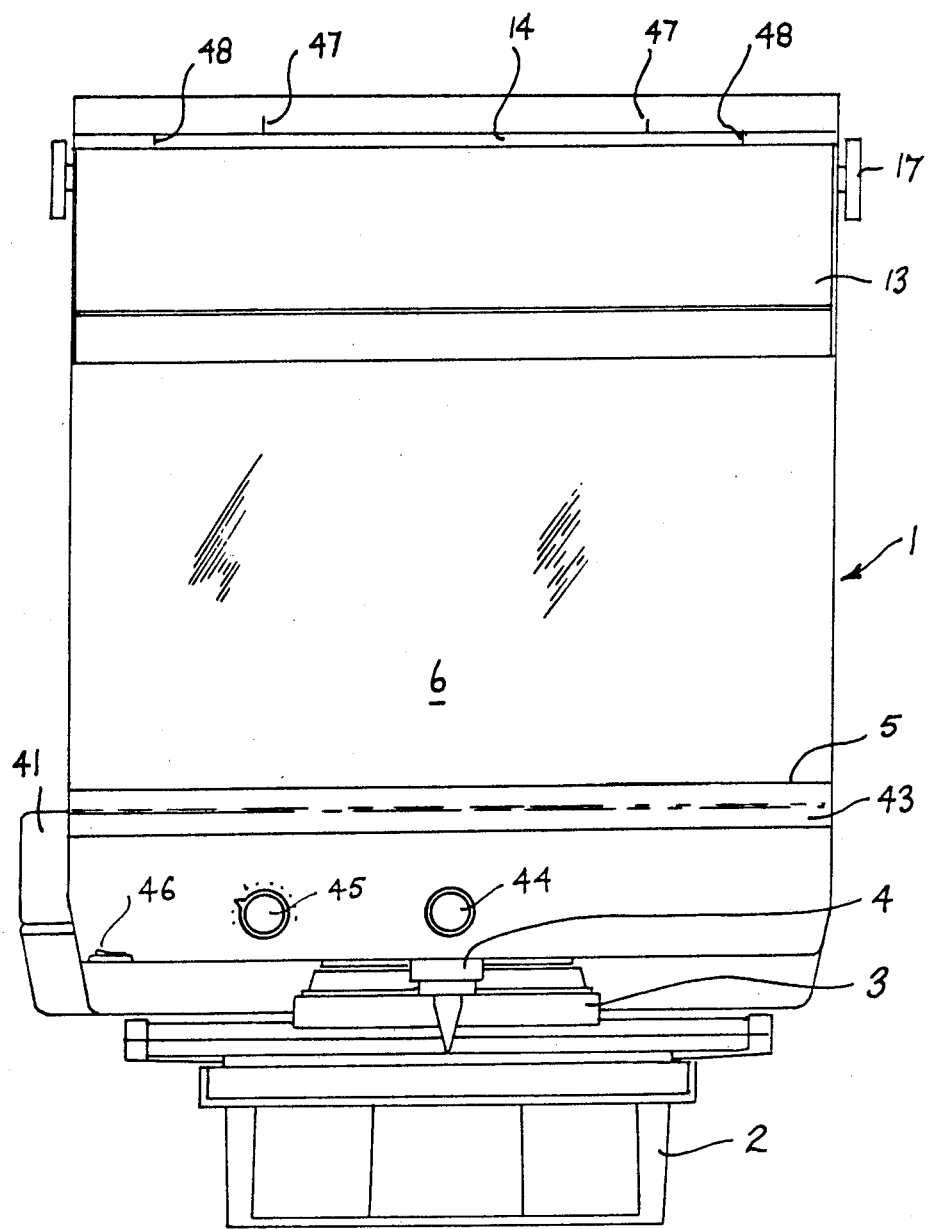
FIG. 1 is a front view of the reader-printer.
Figure 2:
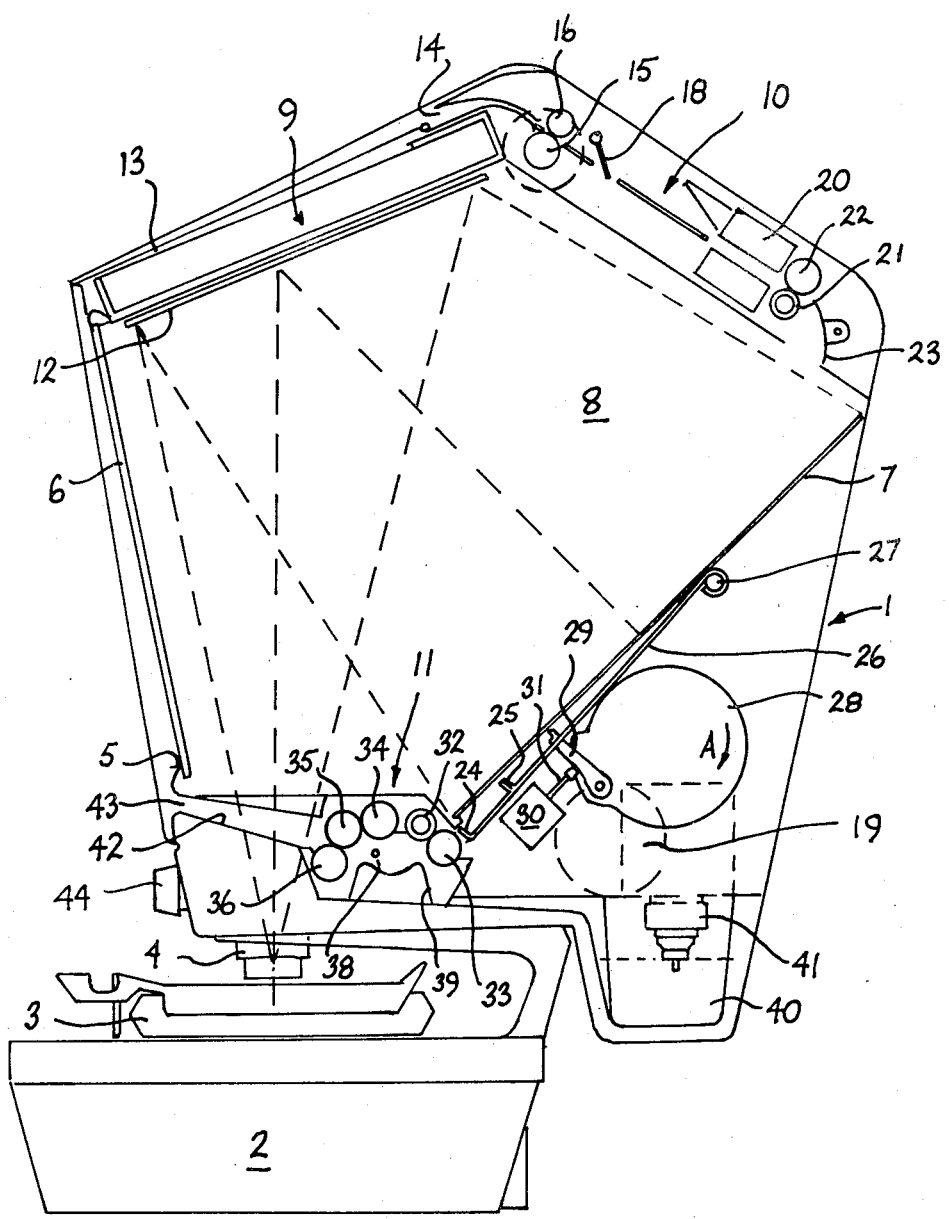
FIG. 2 is a schematic sectional view on the line II—II through FIG. 1.

Referring first to FIGS. 1 and 2 the device illustrated comprises a housing generally designated 1 which is mounted on a lamp box 2. Between the housing 1 and the lamp box 2 a conventional microfiche carrier 3 is located, this carrier being movable in conventional manner to locate any one of the images on a microfiche mounted in the carrier, over the optical axis of a light beam projected up from the box 2 into the housing 1 through a lens system 4. The lamp box 2, carrier 3 and lens system 4 are of conventional design and will not be further described.

The front face of the housing 1 consists essentially of a viewing window 5 which is covered with a sheet of transparent coloured plastics material 6, the colour of the material being selected having regard to the sensitivity range of the photoconductive material used on the copy sheets in a manner as will be described hereafter. The window 5 gives an observer seated outside the housing a clear view of an inclined screen 7 located at the far side of a generally pentagonally shaped viewing space 8. The material 6 of the window 5 and the screen 7 constitute two sides of this space 8, the remaining three sides serving as a reservoir 9 for copy sheets, a charging station 10 and a development station 11. Adjacent the reservoir 9 is a plane reflecting mirror 12 which reflects the image of the microfiche onto the screen 7.

When used as a reader, the observer views the selected microfiche through the window 5 and the coloured sheet of material 6, the image appearing on the screen 7 which is inclined at 45° to the horizontal, a convenient angle at which to view the image.

When the observer wishes to make a permanent copy of a particular image, he can lift a hinged top flap 13 on the upper surface of the housing 1, remove a copy sheet from the reservoir and insert this into an inlet slit 14 above the reservoir 9 until the leading edge of the sheet comes to rest against the nip of a pair of inlet rollers 15 and 16. One of these inlet rollers (15 in the drawing) terminates in a knob 17 exposed to one side of the housing and rotation of the knob will feed the copy sheet between the rollers 15 and 16 further into the charging station 10.

Just downstream of the inlet rollers 15 and 16 is a pivoted finger 18 which is displaced by the leading edge of the fed-in copy sheet, deflection of this finger from its normal rest position actuating a main drive motor 19 (shown schematically in FIG. 2) which powers the various components of the device in the manner hereinafter to be described. When the motor 19 is operating, the rollers 15 and 16 are powered therefrom so that further movement of the copy sheet through the device is effected automatically once the finger 18 has been deflected by the leading edge of the manually fed-in sheet.

Downstream of the finger 18 is a corona charging station 20 and downstream of that, a further pair of feed rollers 21 and 22.

The copy sheet is of zinc oxide coated paper and is fed into the slit 14 with its coated surface facing downwards so that it is the downward-facing surface leaving the corona unit 20 which is charged with the uniform electrostatic charge. Thus it is feed roller 21 which contacts the uniformly charged surface of the copy sheet and this roller is made of suitable electrically insulating material to prevent disturbance of the charged surface by its contact therewith. An arcuate deflector plate 23 downstream of the feed rollers 21 and 22 encourages the leading end of the fed sheet to turn downwardly and, as the feed rollers 21 and 22 advance the sheet, lower the charged sheet down past the inclined screen 7.

Figure 3:
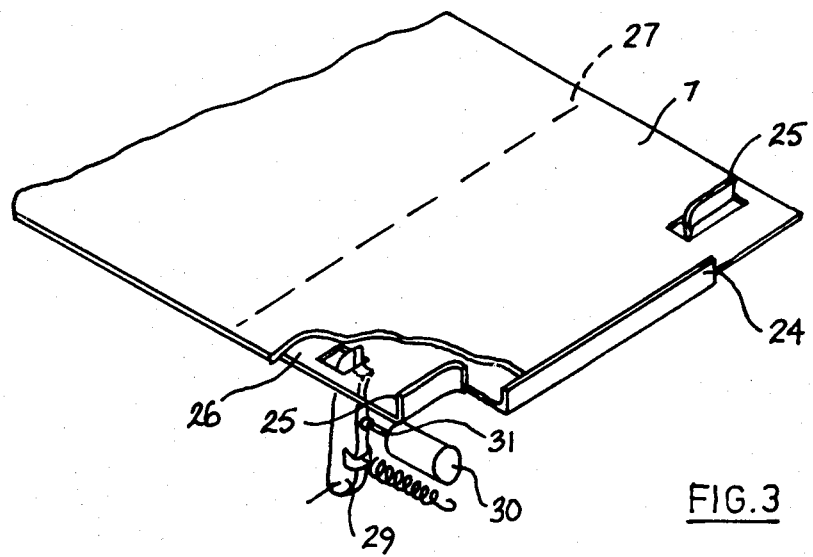
FIG. 3 is a schematic view of the exposure station of the device shown in FIG. 1 and FIG. 2.

Adjacent the bottom edge of the screen 7, two sets of stop means are provided, the lower of these being a first projecting edge 24 and the upper, a pair of bent-up edges 25. From FIG. 3 it can be seen that the edges 25 are spaced apart sufficiently to permit the leading edge of a copy sheet lowered over the screen 7 with its shorter end leading to pass between the edges 25 so that the leading end is brought to rest against the edge 24. If, however, the copy sheet had been fed into the slit 14 with the longer side of the sheet leading, it would be the outer edge portions of this longer side which engaged the spaced-apart edges 25 thus bringing the copy sheet to rest at a somewhat higher position on the screen 7 than in the case where it was the shorter end of the sheet which was the leading end.

The inner extremities of the spaced-apart edges 25 projecting through the screen 7 are curved downwardly to ensure that if a copy sheet, in its fall over the screen 7, moves slightly off line, the curved portions of the edges 25 will deflect it back between the edges 25 so that it comes to rest against the lower edge 24.

The edges 24 and 25 are formed on a flap member 26 which is hinged below the screen 7 on the line 27. A cam member 28, rotatable in the direction of the arrow A during operation of the motor 19, bears against the underside of the flap member 26 during an initial part of its rotation, pushing the latter up into contact with the underside of the screen 7 and thereby causing the edges 24 and 25 to project beyond the upper face of the screen 7. As the flap member 26 moves into this upper position, a pivoted finger 29 locks it into this upper position. Once the finger is locked in place, the flap member 26 is no longer held in its upper position by the cam member 28 so that when the cam surface retracts from the underside of the flap member it remains in the upper position held there by the finger 29. Release of the flap member 26 is effected by means of a solenoid 30 actuating a plunger 31, the plunger bearing against the finger 29. When electrical energy is supplied to the solenoid 30 at the appropriate moment in the processing cycle (as will hereinafter be described), the plunger 31 moves the finger 29 out of its recess in the flap member 26, releasing the latter and allowing it to fall back into the position illustrated in FIG. 2.

Figure 4:
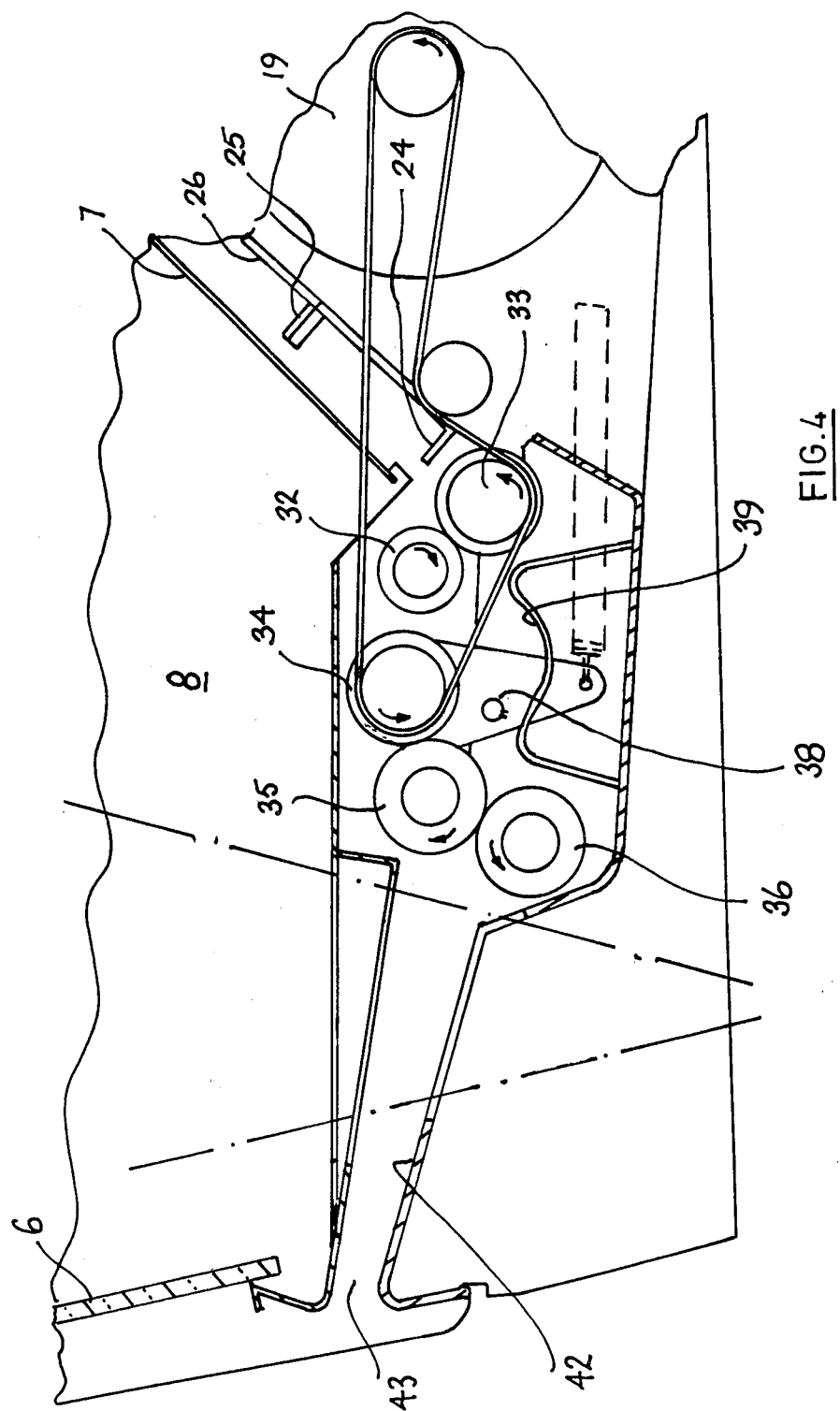
FIG. 4 is an enlarged view of the development station of the device of FIGS. 1 and 2.

Downstream of the screen 7 is the development station 11 and this comprises five rollers numbered 32-36. The path of the copy sheet through the development station is shown more clearly in FIG. 4, the sheet entering the station through the nip between rollers 32 and 33 and leaving the station through the nip between the squeegee rollers 35 and 36. Since roller 32 contacts the copy sheet on the side thereof that supports the charge image, it must be made of appropriate electrically insulating material. The upper squeegee roller 35 is pressed into contact with the lower squeegee roller 36 by a further roller 34. Between the nips of the roller pairs 32, 33 and 35, 36, the copy sheet is made to curve over the upper surface of a shallow trough 39 and below a liquid developer dispensing bar 38. The shallow trough 39 fills with a liquid developer from the bar 38 prior to the approach of the leading edge of a copy sheet. As the sheet passes through the development station the charge image on its upper surface is converted into an image of toner particles by virtue of that upper surface being contacted by developer issuing from the bar 38.

A reservoir for developer liquid is provided at 40 and a bottle 41 supplies fresh liquid developer to the reservoir as this is used up in the development process. A pump and ducting (not shown) are provided to circulate developer from the reservoir 40 to the dispensing bar 38, surplus developer draining back into the reservoir 40 when the pump is operating.

The printed copy sheet, after passing through the nip between the squeegee rollers 35 and 36, enters an outlet passage 42 which terminates in a slot 43 located below the window 5. It will be noted, therefore, that the optical path from the lens system 4 to the mirror 12 passes across the outlet passage 42 and appropriate apertures must be provided in the walls of this passage to permit the light beams to pass therethrough. Although no image can be projected onto the screen 7 when a copy sheet is passing through the outlet passage 42, this does not represent a disadvantage in practice, since a copy sheet is only in the outlet passage in the final stage of a print sequence.

Figure 5:
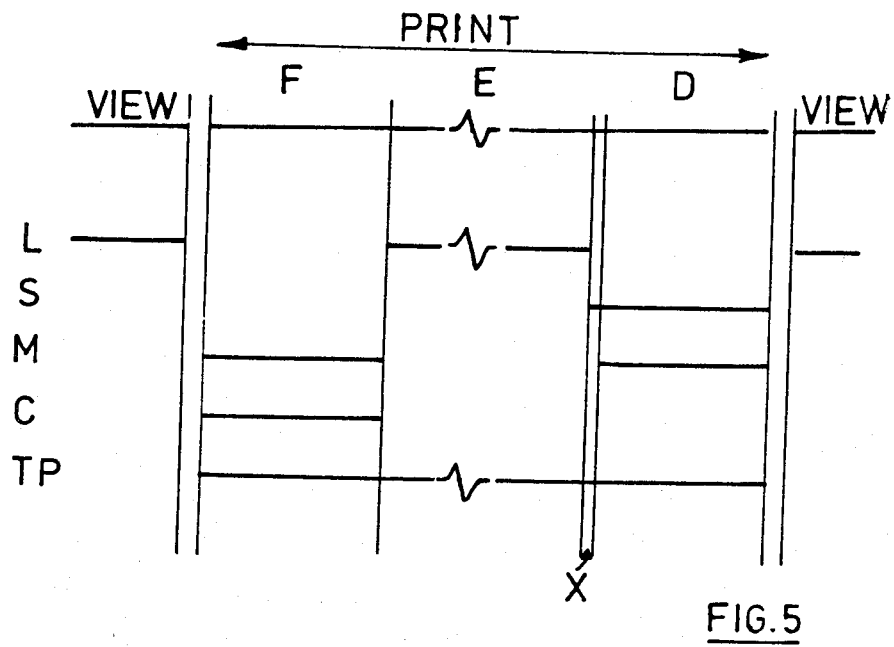
FIG. 5 is a sequencing diagram illustrating the manner in which the device of FIGS. 1 and 2 is operated in practice.

FIG. 5 shows the sequence employed during a print operation, the letters on the left-hand side of the sequence diagram representing the lamp (L), the solenoid 30 (S), the drive motor 19 (M), the corona unit 20 (C) and the toner pump (TP). The print cycle is divided into three sections, the first representing feed of copy material through the charging station 10 (F), the second, exposure of the charged copy material on the screen 7 (E) and finally, development of the copy sheet in the development station 11 (D). The cam 28 controls the sequences in the F and D sections, in the course of a single 360° rotation.

The period of the print cycle allocated to exposure is variable (it depends upon the intensity of the image projected on the screen 7) and this variability has been indicated by the broken lines in that section of the diagram. It is significant to note that the short period indicated X, between stages E and D, represents a delay between operation of the solenoid (and thus withdrawl of the stop means which is holding the copy sheet away from the nip of the inlet pair of rollers 32 and 33) and the re-energisation of the motor 19, which results in rotation of the rollers 32 and 33. This short delay (which in practice need be no more than approximately one second) ensures that the leading edge of the copy sheet is stationary against the nip when the roller pair commences rotation, thus ensuring that the leading edge is normal to the direction of feed of the copy sheet through the development station.

Although the device illustrated employs manual feed of copy sheets from the reservoir 9 into the inlet slit 14, it will be appreciated that the disposition of this reservoir adjacent the upstream end of the charging station 10 makes it a simple matter to modify the design and incorporate automatic paper feed from the upstream end of the reservoir 9 into the downstream end of the charging station 10.

The provision of the coloured sheet material 6 in the window 5 means that it is not necessary to close off the window 5 during exposure of charged material resting on the screen 7. This is because it is possible to select the material 6 so that its transmission wavelength band corresponds to an insensitive region of the charged copy sheet. This is a significant advantage in practice, since it permits a much simpler design of device, there being no need to provide a movable shutter to block out ambient light from the viewing space 8.

The marks 47, adjacent to the slit 14, aid in centring the copy sheet in the slit when it is fed, end first, into the device. If desired, the edges 48 of the slit (which are dimensioned with regard to the width of a sheet fed side first into the slit 14) can be adjustable and can move in symmetrically about the center line of the slit to ensure accurate feed of end first fed sheets.

Knob 44 controls the focus of the lens system 4 and knob 45, the length of the exposure in the print cycle. An on/off switch 46 is also provided.

Although the invention has been described with reference to a front projection type of reader-printer, it is possible to utilise the method of the invention on a rear projection type of device, the copy sheet then being fed in front of the screen and being illuminated from behind.

What is claimed is:

1. A reader-printer comprising a housing having a screen on which an image of a film is projected, and an electrophotographic print facility within the housing for producing a print on a copy sheet of an image projected on the screen which print facility comprises a charging station, an exposure station including said screen and a development station with the path for a copy sheet through the housing extending downwardly from the charging station to the exposure station and downwardly from the exposure station to an inlet of the development station, said facility having mechanical means for feeding a copy sheet from a copy sheet inlet of the housing through the charging station to be uniformly electrostatically charged therein and electrically insulated means issuing said sheet into said exposure station, said exposure station having guide means to allow the uniformly charged copy sheet to drop, under the influence of gravity, from the charging station into a desired exposure position on said screen in the exposure station prior to the formation of the charge image thereon, means to displace said sheet from the exposure station to the inlet of the development station after said charge image formation, said inlet being defined by the nip between a pair of normally non-rotating confronting rollers disposed below the lower end of the exposure station, delay means to initiate rotation of the confronting rollers after a time delay to allow the leading end of the copy sheet to drop against the upstream side of said nip, and mechanical means for feeding the displaced sheet from the nip through said development station.

2. A reader-printer as claimed in claim 1, in which the screen is formed by a plane surface located within the housing and viewed through a transparent window of the housing and inclined at an angle to the horizontal in the range of 45° plus 25° or minus 10° whereby a copy sheet can be slid into said desired exposure position on the screen by said guide means.

3. A reader-printer as claimed in claim 2 in which the outlet of the development station is on the front of the housing below the viewing window.

4. A reader-printer as claimed in claim 2, in which said guide means includes retractable edge stops which temporarily hold the charged copy sheet in said desired exposure position for the exposure until said displacement means releases it for onward movement to the development station.

5. A reader-printer as claimed in claim 4, wherein said copy sheet inlet accommodates manual feed of a copy sheet both with the shorter edge leading and with the longer edge leading, and in which two sets of stop means are provided on the screen, a lower stop means which is effective if a rectangular copy sheet is fed to the copy sheet inlet with the shorter edge thereof leading and an upper stop means which is effective if the copy sheet is fed manually to the copy sheet inlet with the longer edge thereof leading, whereby a copy sheet is automatically arrested at the desired exposure position on the screen.

6. A reader-printer as claimed in claim 5, in which the spacing between the rest positions of the leading edge of a copy sheet when resting respectively on the lower and the upper stop means, is substantially one half the difference between the length and the width of the size of copy sheet for which the reader-printer has been designed to operate.

7. A reader-printer as claimed in claim 1, in which a reservoir for copy sheets is located in the housing and including an openable part of the housing to permit manual removal of a copy sheet from the reservoir when a permanent copy of a projected image is required, said copy sheet inlet being adapted to be fed manually with said copy sheet.

8. A reader-printer as claimed in claim 7, in which the reservoir is located in the upper part of the housing adjacent to said copy sheet inlet.

9. A reader-printer as claimed in claim 8, in which the inlet to the charging station comprises a pair of rollers, electric drive means for said pair of rollers, and means to energise the said electric drive means after initial manual feed of a copy sheet through said copy sheet inlet.

10. A method of producing a copy of an image in a microfilm reader-printer which comprises mechanically feeding a copy sheet through a charging station of the reader-printer to provide a uniform electrostatic charge on the copy sheet and issue the charged sheet out of the station, gravity feeding the uniformly electrostatically charged copy sheet issuing from the charging station into a desired exposure position in an exposure station of the reader-printer prior to exposure therein, exposing said sheet to produce a charge image thereon, after exposure therein displacing said exposed sheet from said exposure position and gravity feeding the exposed copy sheet with a charge image formed thereon from the exposure station to the inlet of a development station of the reader-printer in which the charge image can be converted into a toner image, providing a pair of rollers having a nip to serve as the inlet of said development station, arresting said rollers as said copy sheet is gravity-fed into said nip, and initiating rotation of said rollers after the copy sheet dwells at the nip, and then mechanically feeding the exposed copy sheet through the development station.

* * * * *